United States Patent [19]

Ploch

[11] Patent Number: 4,953,039
[45] Date of Patent: Aug. 28, 1990

[54] REAL TIME DIGITAL DATA TRANSMISSION SPEED CONVERSION SYSTEM

[76] Inventor: Louis W. Ploch, 53 Fayson Lake Rd., Kinnelon, N.J. 07405

[21] Appl. No.: 201,084

[22] Filed: Jun. 1, 1988

[51] Int. Cl.$^5$ .............................................. G11B 5/09
[52] U.S. Cl. ...................................... 360/32; 360/48; 360/39
[58] Field of Search .................... 360/4, 8, 32, 39, 48, 360/49; 369/59

[56] References Cited

U.S. PATENT DOCUMENTS

| | | | |
|---|---|---|---|
| 3,604,299 | 9/1971 | Englund | 84/1.28 |
| 4,081,844 | 3/1978 | Devore et al. | 360/48 |
| 4,104,950 | 8/1978 | Finley | 84/1.28 |
| 4,318,137 | 3/1982 | Cordova et al. | 360/8 |
| 4,458,272 | 7/1984 | Heitmann | 360/8 |
| 4,513,328 | 4/1985 | Heitmann | 360/8 |
| 4,614,983 | 9/1986 | Usami | 360/4 |
| 4,615,024 | 9/1986 | Usai | 369/59 |
| 4,777,857 | 10/1988 | Stewart | 84/1.01 |
| 4,825,305 | 4/1989 | Itoh et al. | 360/8 |

Primary Examiner—Vincent P. Canney
Attorney, Agent, or Firm—Lerner, David, Littenberg, Krumholz & Mentlik

[57] ABSTRACT

An improved real time digital data transmission speed conversion system is disclosed which employs a method of recording high transmission rate serial format data byte groups of given density on to a recording medium. The method includes the steps of converting each high transmission rate serial format data byte group into a corresponding low transmission rate serial data byte group in real time; and, recording the lower transmission rate serial data byte groups in real time, at a density that is higher than the given density, on a moving recording medium. The system employs apparatus which include means adapted to connect the apparatus to a source of the high transmission rate serial format data byte groups of a given density; means for converting each of the serial format data byte groups into a corresponding lower transmission rate serial data byte group in real time and at a density that is higher than the given desnity; and, means adapted to connect the apparatus to a recording device for transmitting the lower transmission rate serial format data byte groups at a higher density in real time to a moving recording medium. As another feature of the system, a recording medium is provided that has digital data stored thereon in a format that includes at least two initial synchronization character bytes, followed by one or more character bytes signifying the start of a record of an event, follopwed by one or more groups of at least one byte each of data relating to the specific event, followed by one or more character bytes signifying the end of the record of the event.

24 Claims, 8 Drawing Sheets

SBP=STARTING BUFFER POINTER
EBP=ENDING BUFFER POINTER

PLAYBACK MODE

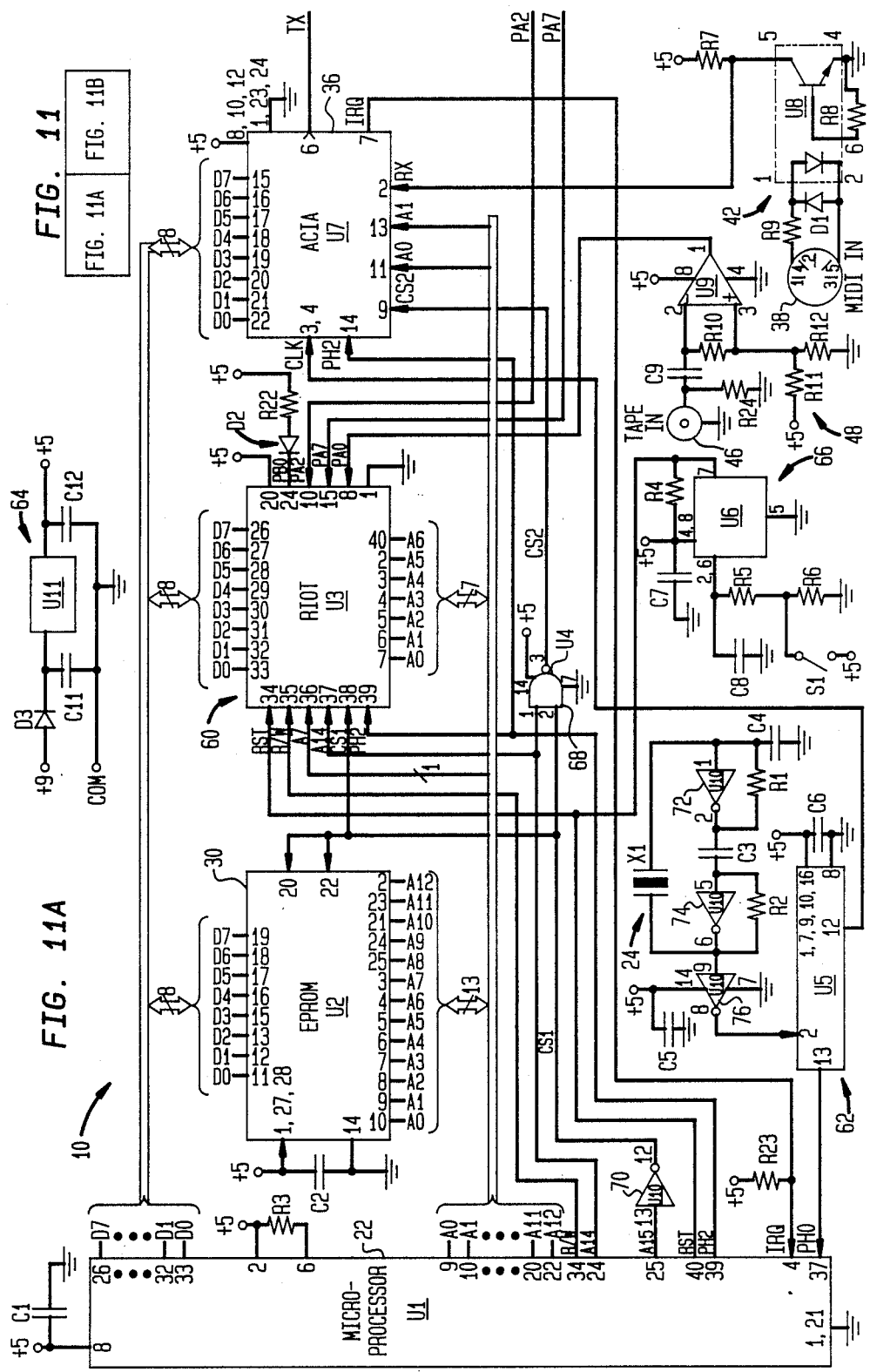

REAL TIME DIGITAL DATA TRANSMISSION SPEED CONVERSION SYSTEM

FIELD OF THE INVENTION

This invention relates to real time systems for converting high transmission rate serial format digital data byte groups of a given density into lower transmission rate, higher density, serial format digital data byte groups, and vice versa, to facilitate recording of such data on, and playback of such data from, an inexpensive recording medium.

BACKGROUND OF THE INVENTION

The conversion system has been described herein with reference to its use in reproducing digitally coded musical information that has been generated in accordance with the format of the Musical Instrument Digital Interface (hereinafter referred to as "MIDI") standard for communication of serially encoded musical data, as standardized by the International MIDI Association and agreed upon by the manufacturers of keyboard synthesizers. MIDI is a standard for transmitting digital signals originated by keys pressed on a synthesizer keyboard and which may be carried over a pair of wires to one or more additional synthesizers which then may all play in concert. The MIDI signals are transmitted at a serial data rate of 31.25 kilobaud and may be processed by various algorithms in computers to allow for transposition, deletion of certain signals, repetition at a fixed time period (echo) or other processes. These signals are typically stored on various computer-controlled media such as hard discs, floppy discs or digital tape. The devices used to record and reproduce MIDI data are typically known as sequencers.

One of the principal functions of known sequencers is to associate with each discrete MIDI data group or "event", an additional code word giving the time of occurence of the event. This allows a large number of events to be stored in the limited extent of a computer memory or floppy disc. Upon reproduction, the sequencer evaluates the time codes and thus recreates the original rythmic structure of the music. In effect, each event is "time stamped" and the entire musical piece must be committed to memory as a "batch". Heretofore, systems have been devised wherein the batched, time-stamped event data groups have been recorded on inexpensive magnetic tape by tape recorders but this has involved batch dumping, rather than real time recording on the tape. It has also required the use of large random access memory, or RAM, units having capacities equal to or larger than the longest musical data to be recorded on the magnetic tape. Examples of time-stamped, batch type tape recording of musical signals may be seen in U.S. Pat. No. 4,614,983, granted to Ryuuzi Usami on Sep. 30, 1986 and U.S. Pat. No. 4,615,024, granted to Minoru Usui on Sep. 30, 1986.

Other systems have been devised for processing musical event data information so that it can be recorded and played back from magnetic tape. These systems, termed imaging systems or sampling systems, involve complex multiplexing arrangements wherein all keys of a keyboard are repetitively sampled at high rates to determine whether or not the key has been actuated. Such continuous sampling or imaging systems in addition to being complex and expensive to produce are susceptible to errors in reproduction due to the lack of coincidence between the actuation of various keyboard keys and the precise times that the keys are being sampled. Sampling, or imaging, can only effectively be done on one 88-key keyboard at a time, and the rate of sampling for each key in such a case is about 25 times per second. If more keys were to be sampled, the rate of sampling would have to be correspondingly slowed down, introducing greater timing errors. In addition, imaging systems are limited in the amount of information that can accompany the base signal that signifies the turning on or off of a given note. In effect it is a single dimensional system of limited applicability as compared to the multidimensional MIDI system. Examples of patents showing imaging or sampling systems are U.S. Pat. No. 3,604,299, granted to Edward J. Englund on Sep. 14, 1971 and U.S. Pat. No. 4,104,950, granted to William S. Finley on Aug. 8, 1978.

The upper end of the frequency response range of inexpensive cassette recorders, players and tapes is about 8 kiloherz, with 4-7 kiloherz being the usual upper range within which reliable recording occurs. As indicated earlier, the MIDI standard provides for a serial data rate of 31.25 kilobaud. Accordingly, direct recording of MIDI signals by such recorders on inexpensive cassette or open reel tape is impossible since the frequency responses of the recorder and tape are too low to properly record the serial data.

It is, therefore, a primary object of this invention to provide an inexpensive system for converting high transmission rate serial format digital data byte groups to lower transmission rate serial format digital data byte groups, and vice versa, to facilitate real time recording of such data on, and playback of such data from, an inexpensive recording medium.

Another object of this invention is to provide an inexpensive accessory to MIDI-equipped synthesizers, allowing the recording of MIDI event signals in their proper real time rythmic and melodic manifestation.

Further objects and advantages of this invention will become apparent as the following description proceeds.

SUMMARY OF THE INVENTION

Briefly stated, and in accordance with one embodiment of this invention, a method of recording high transmission rate serial format data byte groups of a given density onto a recording medium comprises the steps of converting each high transmission rate serial format data byte group into a corresponding lower transmission rate serial data byte group in real time; and, recording the lower transmission rate serial data byte groups in real time, at a density that is higher than the given density, on a moving recording medium.

In accordance with another embodiment of this invention, apparatus for converting high transmission rate serial format data byte groups into lower transmission rate serial format data byte groups, comprises means adapted to connect the apparatus to a source of the high transmission rate serial format data byte groups of a given density; means for converting each of the serial format data byte groups into a corresponding lower transmission rate serial data byte group in real time and at a density that is higher than the given density; and means adapted to connect the apparatus to a recording device for transmitting the lower transmission rate serial format data byte groups at higher density in real time to a moving recording medium.

In accordance with yet another embodiment o this invention, a recording medium is provided that has digital data stored thereon in a format that includes at least two initial synchronization character bytes, followed by one or more character bytes signifying the start of a record of an event, followed by one or more groups of bytes each of the group including one or more bytes therein, each of the bytes being coded with data relating to an aspect of the event that is different from the aspects of the event encoded on the other of the bytes in its group and the group or groups of bytes being followed by one or more character bytes signifying the end of the record of the event.

Although the invention is described herein in connection with its use as an accessory to MIDI-equipped music synthesizers, allowing the recording of MIDI event signals representing musical notes, various other uses of the invention are contemplated, such as robotic and/or motor and solenoid control using MIDI signals; transmission of MIDI signals in real time by radio waves (RF) or by voice grade lines; the use of 31.25 kilobaud MIDI data at rates of 4 kilohertz for information retrieval and processing; and, the use of a unique data format that reduces high speed digital data to slow speed digital data that can be recorded and played back by an analog device such as a tape recorder, compact disc or phonograph record.

BRIEF DESCRIPTION OF THE DRAWINGS

While the specification concludes with claims particularly pointing out and distinctly claiming the subject matter regarded as the invention herein, it is believed that the present invention will be more readily understood from the following description, taken in conjunction with the accompanying drawings, in which:

FIG. 10 is a flow chart explaining the playback operation of the apparatus; and, FIGS. 11, 11A and 11B constitute a wiring diagram that is employed to electrically interconnect the various components of the apparatus shown in FIG. 2, with FIG. 11 pictorially representing the manner in which FIGS. 11A and 11B are to be joined together end-to-end to complete the wiring diagram.

DETAILED DESCRIPTION OF THE INVENTION

Figure 1:
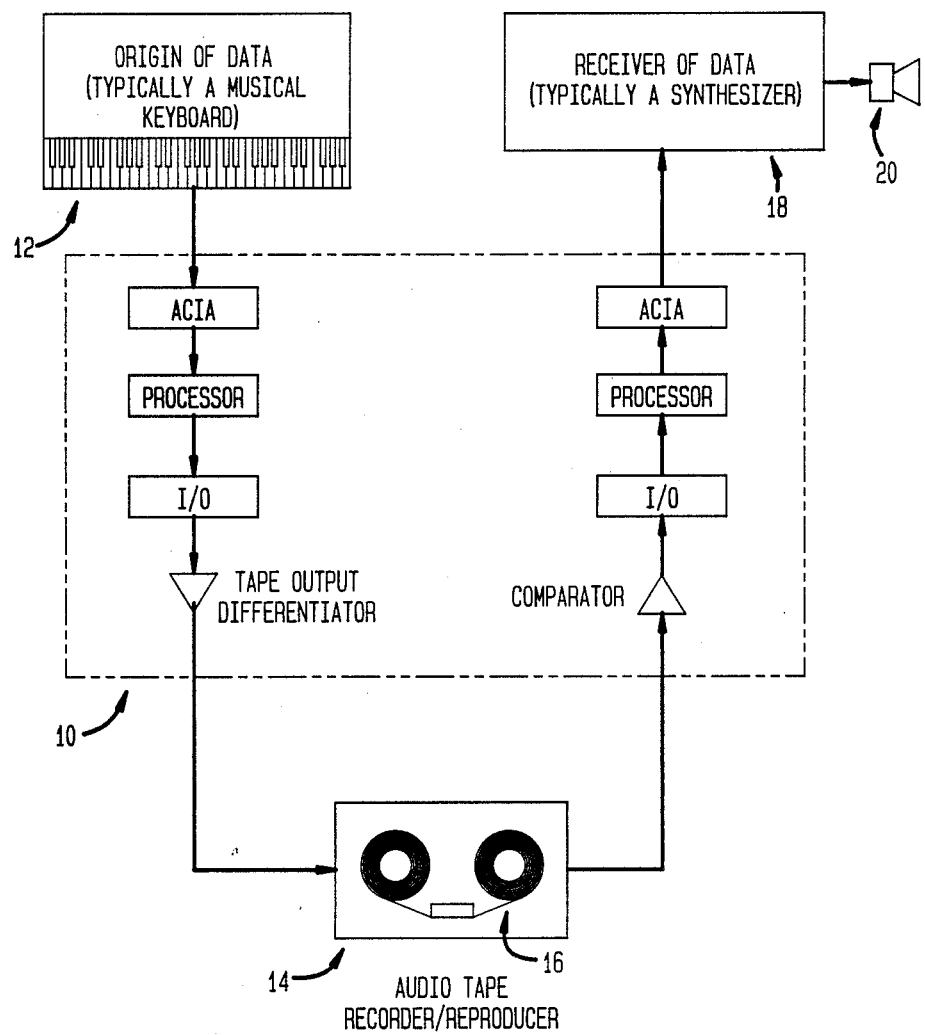
FIG. 1 shows in block diagram form the manner in which signals flow through the apparatus of this invention from a musical instrument keyboard to an audio tape recorder/reproducer, and from the audio tape recorder/reproducer to a synthesizer/speaker.

A real time system for converting high transmission rate serial format digital data byte groups of a given density into lower transmission rate, higher density, serial format digital data byte groups, and vice versa, to facilitate recording of such data on, and playback of such data from, an inexpensive recording medium has been illustrated in the accompanying drawings. Referring to FIG. 1 the conversion system includes a microprocessor controlled device, herein termed a data file device or unit, shown generally at 10, which performs the conversion of data types and speeds between a MIDI output signal generated by a musical keyboard, shown generally at 12, and an inexpensive cassette tape recorder 14 of the sort typically used for analog music recording on a tape 16. The data file unit 10 utilizes the same equipment to convert to MIDI format signals received from the tape 16 of recorder 14 and to send the resulting signals to the MIDI input of a synthesizer 18 that includes a speaker 20 for reproducing the musical notes originally played on keyboard 12 and recorded on tape 16.

In order to store MIDI data having a 31.25 kilobaud transmission rate on tape having a band width of 5-7 kiloherz, the invention takes advantage of the fact that MIDI data typically represents real time manual (i.e., human) keystrokes, switch closings, and the like, and therefore has a low data density with respect to time. Bursts of data at 31.25 kilobaud are typically separated by long periods of inactivity.

Figure 2:
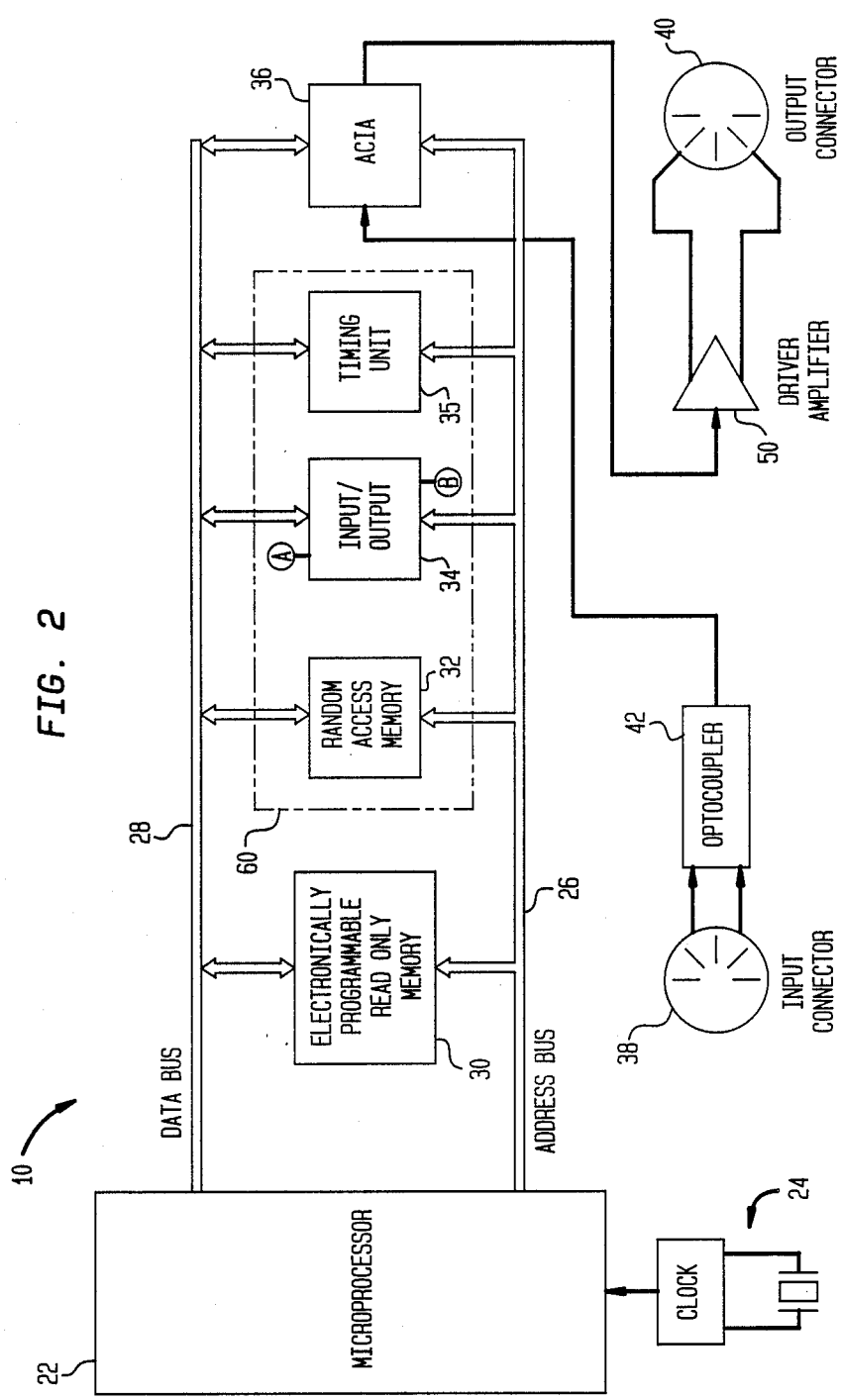
FIG. 2 shows in block diagram form the major components that are present in the apparatus of FIG. 1.

Referring to FIG. 2, the data file unit 10 includes a microprocessor 22 operating from a crystal controlled clock 24, and having connected to its address bus 26 and its data bus 28 an electronically programmable read only memory or EPROM unit 30, a random access memory or RAM unit 32, an input/output device or I/0 unit 34, a timing unit 35, and an asynchronous communications interface adapter or ACIA unit 36. The input/output device 34 is connected to a pair of tape control devices shown in FIGS. 3A and 3B, with the terminal A of FIG. 3A corresponding to the terminal A of I/0 unit 34 in FIG. 2 and the terminal B of FIG. 3B corresponding to the terminal B of I/0 unit 34 in FIG. 2. The data file unit 10 also includes conventional 5-pin DIN input and output connectors 38 and 40 which are adapted to couple the data file unit 10 to a musical keyboard source of MIDI signals and to a MIDI synthesizer playback device, respectively. The MIDI input consists of an asynchronous, serial data stream at 31.25 kilobaud, implemented as a 5 milliampere current loop. An optocoupler 42 serves to convert the MIDI current signals to equivalent voltage signals and also serves to isolate the data file device 10 from the MIDI signal source in order to protect the data file from accidental electrical surges that might occur at the MIDI input.

Asychronous, serial data are converted to parallel data bytes of the kind typically used by microcomputer systems by the ACIA unit 36. Data arriving at ACIA unit 36 are made available to the microprocessor 22 operating under control of a program stored in the EPROM unit 30. After the incoming data has been converted by the program into a format suitable for recording on magnetic tape, it appears at the output terminal B of the input/output unit 34, also identified as terminal B in FIG. 3B. Since magnetic tape is not able to record direct current (DC) signals, the output signal is passed through a differentiator, shown generally at 39, which includes an amplifier 41 and a resistance and capacitance network, shown in block form at 43, and then through a tape output connector 44 to be recorded on magnetic tape (or sent over any voice grade communication channel).

Figure 3A:
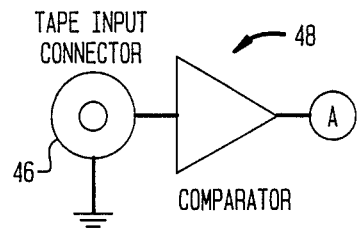
FIGS. 3A and 3B are schematic drawings of tape input and tape output circuits, respectively, that are employed to transfer signals between the components shown in FIG. 2 and an audio tape recorder/reproducer.
Figure 3B:
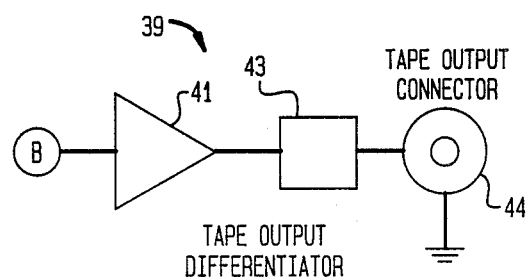

In a reproducing or playback mode of operation of data file unit 10, a signal from tape 16 is introduced into the data file 10 via a tape input connector 46 (FIG. 3A) and a comparator 48 from which it passes via the terminal A of FIG. 3A and the terminal A of FIG. 2 to the input/output device 34 of FIG. 2. This data is processed in turn by the program in the EPROM unit 30 and is then sent to the ACIA unit 34 which would then be operating in the transmitting or "send" mode. The result is that a serial, asynchronous data stream output from the ACIA unit 36 at 31.25 kilobaud occurs. A driver-amplifier 50 converts this signal into a current loop signal and sends it via the output connector 40 to the MIDI playing device or synthesizer 18 (FIG. 1).

The recording medium need not be restricted to cassette tape but is intended to include an form of recording a signal such as open reel tape, wire recording, continuous track magnetic disc, grooved phonograph records, and the like. The requirements for any of the recording and reproducing media are intended to be included in the term "cassette recorder". Thus, any recorder with, as a minimum, the characteristics of a modestly priced commercial cassette recorder such as is used for music and speech recording is intended to be within the ambit of the term "cassette recorder".

Figure 4:
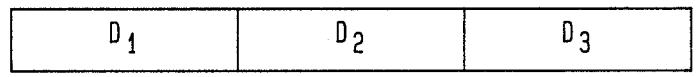
FIG. 4 is a pictorial representation of the format of a MIDI event signal consisting of three bytes, in the form in which the signal is transmitted from a musical keyboard to the input of the apparatus shown in FIG. 2, and vice versa.

The format of a MIDI event is shown in FIG. 4. It consists usually of three bytes, the first of which is the "status" byte, indicating what action is to be taken, such as note "on" or note "off", and also containing an indication of one of sixteen channels or addresses of the data to follow in the subsequent two bytes. The second byte gives the number of the note or key on the keyboard to which the action is to apply and the third byte contains an indication of the dynamic level of that note (i.e., whether it is soft or loud). Other information, such as control change, pitch change, and the like, is also carried in MIDI events. The microprocessor 22 of the data file unit 10, operating under the control of the program stored in EPROM unit 30, causes each event, or series of events which occur in rapid succession, to be recorded on the storage medium in the format illustrated in FIG. 5 and described below.

Three (or more) synchronizing character bytes SYN start each tape record, followed by a start-of-record character byte SOR. Then, as many MIDI events $D_1$ $D_2$... $D_n$ as are to play "simultaneously" are recorded either in the normal MIDI format or in some compressed format or other format. After the MIDI data, the record is ended with an end-of-record character byte EOR. Since the tape motion is continuous, blank tape exists between records, and the timing of the tape is the same as the timing of the various notes of the music. Thus, the MIDI events are recorded directly on a tape cassette in real time, the movement of the tape medium itself being sufficient to separate the various events at their proper times of occurrence. The storage capacity of a 90 minute cassette, giving 45 minutes of recording time on each side, is the same whether analog audio music be recorded thereon, or digital MIDI events by this invention.

In the preferred embodiment of this invention the synchronizing character bytes SYN are preferably randomized, nonsymmmetric characters such as the hexadecimal "16" character. Similarly, the start-of-record character byte SOR is preferably a hexadecimal "FD" character and the end-of-record character EOR is preferably a hexadecimal "F9" character.

Referring to FIGS. 6-9, a description of the software logic of this invention during the "record" function of data file unit 10 will now be given. The recording program is interruptdriven. Thus, the ACIA unit 36 will cause an interrupt in the recording program, shown in FIG. 6, whenever its "receive" buffer has assembled a new byte of input data. At that time, the data file unit 10 enters the interrupt routine, shown in FIG. 8, and the new data byte is stored in a "circular" software buffer, illustrated in FIG. 7, at the location pointed to by a starting buffer pointer SBP, to await further processing. The SBP pointer is updated and control is then returned to the interrupted routine. This is a high-priority or "foreground" operation.

Figure 9:
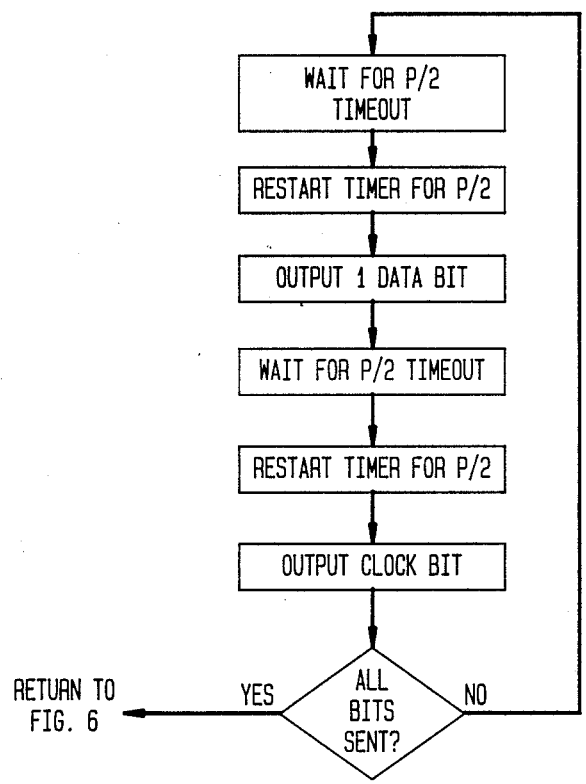
FIG. 9 is a flow chart explaining a tape write subroutine which is used in the apparatus in connection with timing the sending of the data bits in each data byte to the recording medium.

It should be noted that due to the highly precise timing requirements of the tape write sub-routine, illustrated in FIG. 9, the occurrence of an interrupt signal generated by the ACIA unit 36 pursuant to the conditions described in the above paragraph, does not, in all cases, result in an immediate interruption of the operation program. Rather, such interrupt requests as occur during the critical timing sequences of the tape write sub-routine are deferred until the completion of such timing sequences. In this way, the occurrence of an incoming MIDI signal is prevented from compromising the integrity of a biphase code utilized in the system, which code is simultaneously being output to the tape.

Certain steps of the operating program are instructions which either enable or disable the operating program from recognizing an interrupt request. It is, however, highly necessary that a deferred interrupt request be acted upon or taken before the occurrence of a second or further MIDI input. Otherwise, the first interrupt request will be lost, causing an undesirable error condition. The placement of the interrupt enable and interrupt disable instructions in the program insure that these conditions are met.

Figure 6:
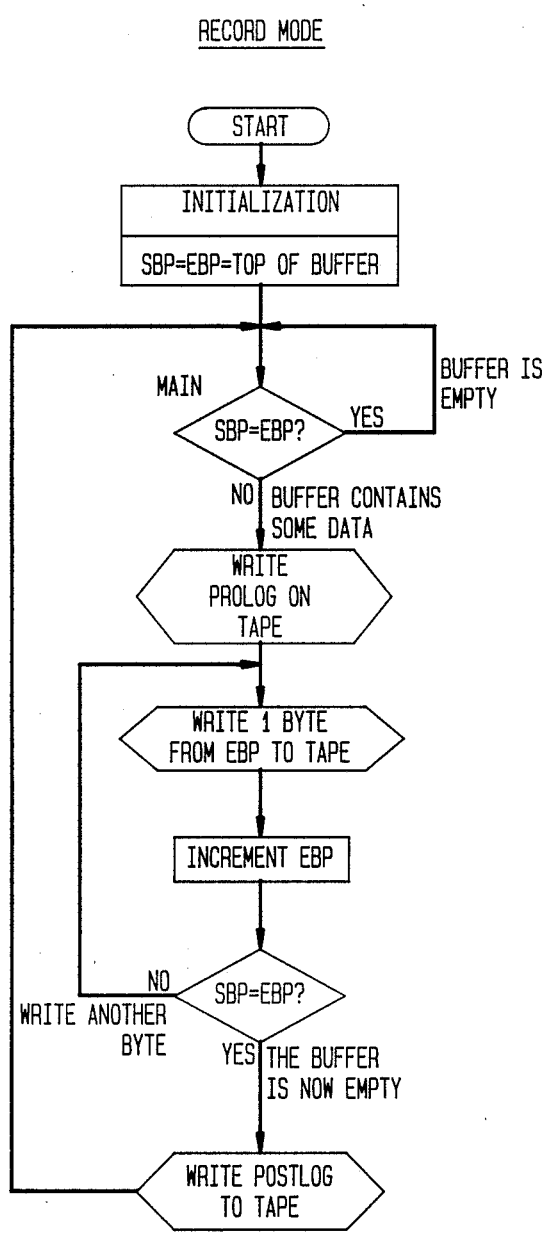
FIG. 6 is a flow chart explaining the recording operation of the apparatus shown in FIG. 2.
Figure 7:
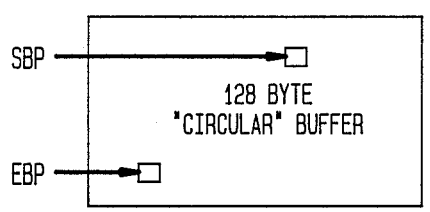
FIG. 7 is a pictorial representation of a circular buffer used in the software of the apparatus
Figure 8:
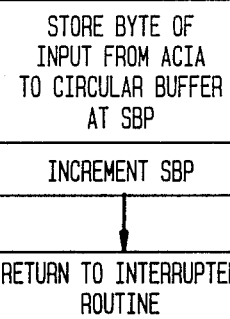
FIG. 8 is a flow chart explaining an interrupt subroutine which is employed in the apparatus to facilitate real time storing of incoming data byte groups in the circular buffer of FIG. 7.

Returning to a consideration of the recording program of FIG. 6, when there is no data in the circular software buffer, and no data is coming in, the program loops at MAIN. When a byte is detected by the non-coincidence of the starting buffer pointer SBP and the ending buffer pointer EBP (i.e., EBP is not equal to SBP), the tape output sequence begins. First, a group (preferably three or more) of synchronizing bytes SYN are written to tape. Then a start-of-record byte SOR is written to tape The group of bytes including the SYN bytes and the SOR byte is called the PROLOG. Subsequently, data bytes are written to tape, using the tape write sub-routine shown in FIG. 9, in the order that they are read out of the circular software buffer.

After each byte is read from the buffer, at EBP, the EBP pointer is updated and tested against SBP. If EBP does not equal SPB, another data byte is written, and so on, until the buffer becomes empty and EBP equals SBP. When EBP is equal to SBP after writing one or more data bytes to tape, a POSTLOG is written, consisting of one end-of-record byte EOR, after which the tape output is closed and blank tape passes until the next PROLOG is written to tape.

If further MIDI input is received in the receive buffer of ACIA unit 36 during operation of the tape write sub-routine, the interrupt routine places this data in the circular software buffer without disturbing the tape write sub-routine. The tape write sub-routine is called the "background" or low-priority operation. The tape is encoded with the data in a self-clocking code known as bi-phase coding. It should be noted that the real time occurrence of input "events" is represented on the tape in real time also. That is, blank tape separates the events in time.

Considering the tape write sub-routine of FIG. 9 at this time, this sub-routine takes a single byte of data as input and sequences it as a serial data stream for output to the tape medium (or other communications channel) where it will be recorded as a series of magnetic flux polarity reversals. The nature of the bi-phase code requires that two pulses, which will produce flux reversals on tape, must be output for each bit of data to be recorded. These two pulses are (1) a clock pulse, and (2) a data pulse. The clock pulse must always occur; the data pulse occurs if the data bit to be sent is a "mark" or a "1" (one). The data pulse is omitted if the data bit is a "space" or a "0[ (zero).

The two pulses are necessary but not sufficient to communicate a data bit. In addition, the two pulses must occur (or not occur, as in the case of data bit=0) at specific times and, therefore, the flux reversals will occur at specific physical positions on the tape. The time difference between two sequential clock pulses is known as one "period", abbreviated "P". The time between a clock pulse and the position of the following data pulse (if it occurs) is one-half-period, or P/2. These times are determined by counting the pulses of a phase two clock output from the microprocessor 22. The integrated circuit of RIOT unit 60 contains a timer function which performs this counting.

The time requirements of the operating software of the data file unit 10 are such that during system initialization for the "record" function, the timer is started for a time period of P/2. That is, after P/2 counts have elapsed, the timer will indicate the status of "time out". Upon the first entry to the tape write sub-routine, the counter is already counting, but is not yet timed out. Therefore, the program waits for the P/2 timeout. When this occurs, the clock pulse is output to tape and the timer is restarted for a period of P/2. The data to be sent is then examined and the presence or absence of the data-pulseto-be is decided upon. Then the program waits again for P/2 timeout. When this occurs, the data pulse is dealt with and the timer is restarted for P/2. Thereupon the tape write sub-routine sets up the next data bit of the 8-bit byte that was its input and repeats the above operations or, if the last bit has been sent, it returns to the main program.

Figure 5:
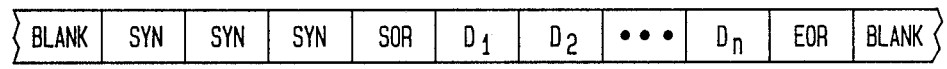
FIG. 5 is a pictorial representation of a MIDI event whose format has been converted by the apparatus of FIG. 2 from its original form to a form in which it is to be recorded on the recording medium.
Figure 10:
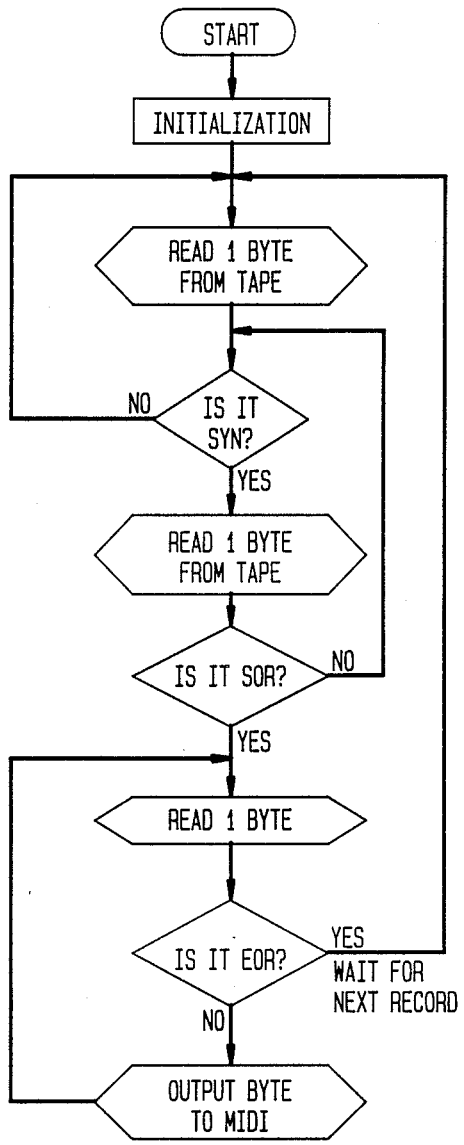

Referring now to FIG. 10 a description of the software logic employed during the "playback" function of data file unit 10 will now be given. As indicated earlier, the format of the MIDI data as it has been stored on the storage medium is shown in FIG. 5. The playback program reads input from the tape until it encounters a SYN byte which signals the start of synchronization and the beginning of a new record. It then reads as many SYN synchronization characters as there ar at the start of the record (typically three) after which it expects a SOR start-ofrecord byte. In the absence of a SOR byte the current record is aborted and a new SYN byte is awaited. After the SYN/SOR sequence occurs, the bytes following this sequence are taken as MIDI data bytes, processed by the system and passed to the MIDI output connector 40 via a "transmit" buffer in the ACIA unit 36 of FIG. 2.

During the processing of data bytes, each byte is compared to the EOR end-of-record byte, a configuration not found in MIDI data. When an EOR byte is encountered, the MIDI data stream is terminated and the system once more awaits a new SYN byte.

As indicated earlier, a MIDI event typically consists of three bytes. The first byte is the operation code, indicating what action is being commanded (e.g., note on, note off, control change, etc.); the second byte gives the note number, ranging from zero to 127; and the third byte indicates the dynamics or loudness of the note, in a range from 0 to 127.

Figure 11B:
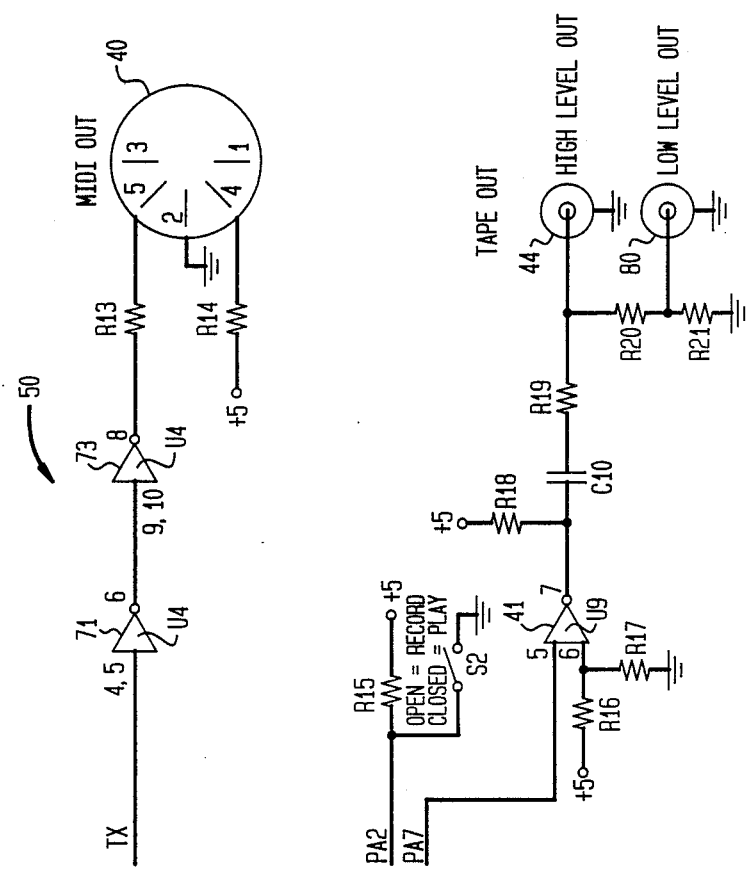

Referring now to FIGS. 11, 11A and 11B, an electrical wiring diagram for interconnecting the various components of the data file unit 10 has there been illustrated. To facilitate commercial identification of various of the electronic components illustrated in FIGS. 11, 11A and 11B they have been given alphanumeric designations in addition to the numerical designations they may have been given in FIG. 2 or elsewhere herein. Thus, microprocessor 22 is also identified as unit U1. The EPROM unit 30 is also identified as unit U2. The RAM unit 32 and the input/output device 34 are identified as part of unit U3. Unit U3, in addition to encompassing RAM unit 32 and I/0 device 34, includes a timing unit 35 therein and is hereinafter also referred to as "RIOT" unit 60 to encompass its three functions (i.e., RAM, I/O and timing). The ACIA unit 36 is designated by the alphanumeric symbol U7. The clock 24 includes a 4.0 megaherz crystal Xl therein, as well as two inverters of a quad inverter U10, as part of its circuit 24. Also, the amplifier 41 of tape output differentiator 39 comprises a unit denoted U9, and the driver-amplifier unit 50 includes two amplifiers of a quad NAND gate U4, wired as inverters.

The circuitry of FIGS. 11, 11A and 11B also includes a programmable divider 62 having the alphanumeric designation U5; a 5-volt positive regulator 64, having the alphanumeric designation U11; a timer 66 having the alphanumeric designation U6; and the opto-coupler 42, having the alphanumeric designation U8, and so forth, as identified on FIGS. 11, 11A and 11B.

TABLE I, which follows, gives the values of the various resistors employed in the electrical circuitry of FIGS. 11, 11A and 11B.

TABLE I

| \multicolumn{4}{c}{RESISTOR VALUES} | | | |
|---|---|---|---|
| Resistor Numbers | Value in Ohms | Resistor Number | Value in Ohms |
| R1 | 1,500 | R13 | 220 |
| R2 | 1,500 | R14 | 220 |
| R3 | 2,200 | R15 | 2,200 |
| R4 | 3,300 | R16 | 1,000 |
| R5 | 1,000 | R17 | 1,000 |
| R6 | 47,000 | R18 | 560 |
| R7 | 560 | R19 | 10,000 |
| R8 | 330,000 | R20 | 470 |
| R9 | 220 | R21 | 10 |
| R10 | 10,000 | R22 | 330 |
| R11 | 1,200 | R23 | 2,200 |

TABLE I-continued

| RESISTOR VALUES | | | |
|---|---|---|---|
| Resistor Numbers | Value in Ohms | Resistor Number | Value in Ohms |
| R12 | 220 | R24 | 10 |

TABLE II, which follows, gives the values of the various capacitors employed in the electrical circuitry of FIGS. 11, 11A and 11B.

TABLE II

| CAPACITOR VALUES | |
|---|---|
| CAPACITOR NUMBER | VALUE IN MICROFARADS |
| C1 | 0.1 |
| C2 | 0.1 |
| C3 | 0.01 |
| C4 | 0.00001 |
| C5 | 0.1 |
| C6 | 0.1 |
| C7 | 0.1 |
| C8 | 0.22 |
| C9 | 0.0015 |
| C10 | 0.1 |
| C11 | 1.0 |
| C12 | 1.0 |

TABLE III, which follows, gives commercial designations and brief descriptive terms for the various alphanumerically designated components shown in FIGS. 11, 11A and 11B, as well as the numerical designations of these components, as given in FIG. 2 or elsewhere herein.

TABLE III

| ELECTRONIC COMPONENTS | | | |
|---|---|---|---|
| Alphanumeric Designation | Commercial Designation | Description | Numerical Designation |
| U1 | Commodore 6502 | Microprocessor | 22 |
| U2 | Motorola 2764 | EPROM | 30 |
| U3 | Commodore 6532 | RIOT | 32, 34, 60 |
| U4 | Motorola 74LS00 | Quad NAND Gate | 50, 68 |
| U5 | Motorola 74LS161 | Programmable Divider | 62 |
| U6 | Motorola NE555 | Timer | 66 |
| U7 | Motorola MC6850 | ACIA | 36 |
| U8 | Hewlett Packard 4N33 | Opto-Coupler | 42 |
| U9 | Motorola LM393N | Dual Comparator | 41, 48 |
| U10 | Motorola 74LS04 | Quad Inverter | 24, 70 |
| U11 | Motorola LM78905 | 5-Volt Positive Regulator | 64 |

In addition to the components identified in the foregoing tables the electrical circuits of FIGS. 11, 11A and 11B include a 1N914 diode D1, a light emitting diode D2 and a 1N4007 diode D3; a normally open push button switch S1; a single pole single throw switch S2; and, the aforementioned 4.0 megaherz crystal X1 employed in the clock 24.

The items listed in TABLE III above are commercially available under the commercial designations and descriptions given therein. The full addresses of the commercial sources listed in TABLE III are as follows:

Commodore Semiconductor Group
950 Rittenhouse Road
Norristown, PA 19403
Motorola Semiconductor Products Inc.
3501 Ed Bluestein Boulevard
Austin, TX 78721
Hewlett Packard Company
West 120 Century Road
Paramus, NJ 07652

Referring to FIGS. 11A, and 11B, the power supply source for the electrical circuits of data file unit 10 includes a conventional transformer/rectifier unit (not shown). This may be plugged into a standard 110 volt AC source to provide a rectified 9 volt DC output with respect to a common or ground line. The positive 9 volt DC output is provided as an input to the +5 volt DC regulator 64, which regulator includes an input diode D3, the regulator U11 and a pair of capacitors C11 and C12 connected between the +9 volt DC line and the ground line and the +5 volt DC line and the ground line, respectively. The +5 volt DC output of regulator 64 is delivered to a number of locations in the data file unit 10 via conductors (not shown), each of the delivery points being indicated by a "+5" symbol at the start of a conductor at that location. Thus, a +5 volt DC signal is delivered to terminal 8 of the microprocessor 22 via a conductor which is also connected to ground through a capacitor C1; and, a +5 volt DC signal is also delivered to terminal 2, and through a resistor R3 to terminal 6, of microprocessor 22.

The data bus 28 of microprocessor 22 includes eight conductors therein, identified $D_0$ through $D_7$, which are connected respectively to the terminals 33, 32, 31, 30, 29, 28, 27 and 26 of microprocessor 22. The various cables $D_0$-$D_7$ are also connected to corresponding terminals 11-13 and 15-19, respectively, of EPROM unit 30, as well as to terminals 33, 32, 31, 30, 29, 28, 27 and 26, respectively of RIOT unit 60, and to terminals 22, 21, 20, 19, 18, 17, 16 and 15, respectively, of the ACIA unit 36.

The address bus 26 of microprocessor 22 comprises a 13 conductor cable which includes conductors therein identified $A_0$ through $A_{12}$. The conductors $A_0$ through $A_{12}$ are connected to terminals 9 through 20 and 22, respectively, of microprocessor 22. In addition, conductors $A_0$ through $A_{12}$ of address bus 26 are connected to terminals 10, 9, 8, 7, 6, 5, 4, 3, 25, 24, 21, 23 and 2, respectively, of EPROM unit 30. Also, conductors $A_0$ through $A_6$ of address bus 26 are connected to the respective terminals 7, 6, 5, 4, 3, 2 and 40 of RIOT unit 60; and, conductors $A_0$ and $A_1$ of address bus 26 are connected to the respective terminals 11 and 13 of ACIA unit 36.

Terminal 34 of microprocessor 22 is connected via a conductor R/W with terminal 35 of RIOT unit 60; terminal 24 of microprocessor 22 is connected via a conductor A14 to terminal 37 of RIOT unit 60 and, also, to terminal 1 of one NAND gate 68 of a quad NAND unit; terminal 25 of microprocessor 22 is connected via a conductor A15 to an input terminal 13 of one inverter 70 of a quad inverter unit, the output terminal 12 of which inverter connects via a conductor CS1 to the input terminal 2 of NAND gate 68, to the terminals 20 and 22 of EPROM unit 30 and to the terminal 38 of RIOT unit 60; terminal 40 of microprocessor 22 connects via a conductor RST to terminal 34 of RIOT unit 60, as well as to terminal 7 of timer 66; terminal 39 of microprocessor 22 is connected via a conductor PH2 to terminal 39 of RIOT unit 60 and to terminal 14 of ACIA unit 36; terminal 37 of microprocessor 22 connects via a conductor PHI to terminal 13 of the programmable divider 62 and receives a one megahertz signal therefrom; terminal 4 of microprocessor 22 connects via a conductor IRQ to terminal 7 of ACIA unit 36, as well as to one end of resistor R23, the other end of which resistor is provided with a +5 volt DC signal from +5 volt regulator 64; and, terminals 1 and 21 of microprocessor 22 are connected to the common or ground side of regulator 64.

Terminals 1, 27 and 28 of EPROM unit 30 are provided with a +5 volt DC input from regulator 64, and the conductor bringing the +5 volt DC voltage to EPROM terminals 1, 27 and 28 is shunted to ground by a capacitor C2 which is connected to the conductor adjacent to its point of attachment to such terminals 1, 27 and 28. Terminal 14 of EPROM unit 30 is also connected to the ground or common line of voltage regulator 64. The remaining terminals of EPROM unit 30 have heretofore been discussed in connection with the discussion of the various terminals of microprocessor 22.

Terminal 20 of RIOT unit 60 receives a +5 volt DC input from the voltage regulator 64; terminal 24 of RIOT unit 60 is connected via a conductor PBO through a light emitting diode D2 and a resistor R22 to the +5 volt DC line of regulator 64; terminal 10 of RIOT unit 60 is connected via a conductor PA2 both to one end of a resistor R15, the other end of which is connected to the +5 volt DC side of regulator 64, and to the movable pole of a single pole single throw switch S2. Switch S2 is used to change the mode of operation of data file unit 10 from the "record" mode, when switch S2 is open, to the "playback" mode, when switch S2 is closed so as to connect terminal 10 of RIOT unit 60 to ground. Terminal 15 of RIOT unit 60 is connected via a conductor PA7 to terminal 5 of one comparator 41 of a dual comparator unit; terminal 8 of RIOT unit 60 is connected via a conductor PA0 to terminal 1 of the other comparator 48 of the dual comparator unit; and, terminal 1 of the RIOT unit 60 is connected to the common or ground line of the +5 volt regulator 64. The remaining terminals of RIOT unit 60 were heretofore discussed in connection with the discussion of the terminals of microprocessor 22.

Referring now to the ACIA unit 36, terminals 8, 10 and 12 of this unit are connected to the +5 volt DC side of regulator 64 and terminals 1, 23 and 24 of this unit are connected to the common or ground side of regulator 64. Terminal 6 of ACIA unit 36 is connected via a conductor TX to terminals 4 and 5 of a first NAND gate 71 wired as an inverter in driver-amplifier 50, the output terminal 6 of which inverter is connected to terminals 9 and 10 of a second NAND gate 73 wired as an inverter in the driver-amplifier 50. The output terminal 8 of inverter 73 is connected through a resistor R13 to the terminal 5 of MIDI output connector 40, terminal 2 of which connector is connected to the ground line of regulator 64 and terminal 5 of which connector is connected through a resistor R14 to the +5 volt DC line from regulator 64. Terminal 7 of ACIA unit 36, as indicated earlier, is connected via conductor IRQ to terminal 4 of microprocessor 22 and to resistor R23. Terminal 2 of ACIA unit 36 is connected via a conductor RX to terminal 5 of opto coupler 42. Terminal 9 of ACIA unit 36 is connected via a conductor CS2 to terminal 3 of the NAND gate 68, the terminal 7 of which NAND gate is connected to the ground or common line of regulator 64 and the terminal 14 of which is connected to the +5 volt DC signal of regulator 64; and, terminals 3 and 4 of ACIA unit 36 are connected via a conductor CLK to terminal 12 of the programmable divider 62 for receiving a 500 kiloherz signal therefrom. The remaining terminals of ACIA unit 36 were heretofore discussed in connection with the discussion of the terminals on microprocessor 22.

Turning now to the circuitry associated with the clock 24, one side of the four megaherz crystal X1 is connected to the input terminal 1 of an inverter 72, the output terminal 2 of which is connected through a capacitor C3 to the input terminal 5 of an inverter 74. The other side of crystal X1 is connected to the output terminal 6 of inverter 74 as well as to the input terminal 9 of yet another inverter 76, whose output terminal 8 is connected to terminal 2 of programmable divider 62. Inverter 72 is shunted by a resister R1 and the input terminal 1 of inverter 72 is connected to one side of a capacitor C4 the other side of which is connected to the ground or common line of regulator 64. Similarly, inverter 74 is shunted by a resister R2. Also, inverter 76 has its terminal 14 connected to the +5 volt DC signal from regulator 64; and the terminal 7 of inverter 76 is connected to the common or ground line of regulator 64. A capacitor C5 is connected between the +5 volt DC source at terminal 14 of inverter 76 and the ground or common line of regulator 64.

The programmable divider 62 has its terminals 1, 7, 9, 10 and 16 connected to the +5 volt DC signal from the regulator 64, and its terminal 8 connected to the common line or ground of the regulator. A capacitor C6 interconnects the grounded terminal 8 of the programmable divider with the +5 volt DC line connected to terminals 1, 7, 9, 10 and 16. The connections to the remaining terminal of programmable divider 62 were discussed earlier in connection with the discussions of other components of the electrical circuitry.

Considering the timer 66 at this point, a +5 volt DC voltage from regulator 64 is delivered to terminals 4 and 8 of timer 66, and a resistor R4 interconnects the +5 volt DC signal on its terminals 4 and 8 with its terminal 7. A second +5 volt DC signal from voltage regulator 64 is delivered through a normally open push button switch S1 and a resistor R5 to terminals 2 and 6 of timer 66. The timer terminals 2 and 6 are also connected through a capacitor C8 to ground, and the junction of switch S1 and resistor R5 is connected by a resistor R6 to ground. The push button switch S1 and timer 66 serve as a reset mechanism which initializes or sets the data file unit 10 to a proper starting point in the program when the unit has been initially powered up or when the switch S2, which is connected to terminal 10 of the RIOT unit 60 and switches the mode of operation of the data file unit 10 between its recording function and its playing function, is actuated.

Considering the comparator 48 in the tape input portion of the circuitry at this time, terminal 8 thereof is connected to the +5 volt DC source of regulator 64; terminal 4 thereof is connected to the common or ground line of regulator 64; and terminal 2 of comparator 48 is connected through a capacitor C9 to the input terminal of tape input connector 46, the outer portion of which is connected to the common or ground line of regulator 64. Also, a +5 volt DC signal from regulator 64 is fed through a resistor R11 to terminal 3 of the comparator 48; the terminals 2 and 3 of the comparator are interconnected by a resistor R10; and terminal 3 of the comparator 48 is connected to one side of a resistor R12, the other side of which is connected to the common or ground line of regulator 64.

Considering the electrical circuitry associated wit the differentiator 39, terminal 5 of amplifier 41 thereof is connected to terminal 15 of the RIOT unit 60, as indicated earlier. Terminal 6 of amplifier 41 connects through a resistor R16 to the +5 volt DC signal from regulator 64, and through a resistor R17 to the ground or common line of the regulator 64. Terminal 7 of amplifier 41 is connected through a resistor R18 to the +5 volt DC signal of regulator 64. It is also connected directly to one side of a capacitor C10, the other side of which is connected through a resistor R19 to the center terminal of a high level tape output connector 44. The outer terminal of connector 44 is connected to the ground or common line of regulator 64. One side of a resistor R20 is connected to the junction of resistor R19 and the center terminal of connector 44 and the other side of resistor R20 is connected to the center terminal of a low level tape output connector 80, the outer terminal of which is connected to the ground or common line of regulator 64 One side of a resistor R21 is connected to the junction of the center terminal of connector 80 and resistor R20 and the other side of resistor R21 is connected to the ground or common line of regulator 64.

With the various components of the data file unit 10 electrically interconnected in the manner shown in FIG. 11 and discussed above, and with a suitable operating program introduced into the read only memory of EPROM 30, the data file unit 10 may be used to receive high transmission rate, low density, MIDI format signals through the MIDI input connector 38 and to send these signals, in real time, at a lower transmission rate, higher density, converted form, through the tape output jack 44 to be recorded on a moving tape when switch S2 of the driver amplifier 50 is in its open position. Alternatively a tape having previously recorded real time converted MIDI signals thereon may be played on a recorder and the output thereof introduced through the input connector 46 to the data file unit 10, reconverted back to the original MIDI format and delivered through the MIDI output connector 40 to a MIDI sequencer for playback through a speaker.

A suitable machine language program which may be introduced in accordance with conventional known practices to the electronically programmable read only memory unit 30 of data file unit 10 is listed below in TABLE IV. The program, entitled Disassembly Listing of ROM Direct, has been given subtitles at various points within the listing thereof in TABLE IV to indicate what the various machine language portions following the subtitles relate to.

TABLE IV
DISASSEMBLY LISTING OF ROM DIRECT

| | Initialization for Playback | | |
|---|---|---|---|
| E000 | 78 | SEI | |
| E001 | A2 7F | LDX | #$7F |
| E003 | 9A | TXS | |
| E004 | D8 | CLD | |
| E005 | A2 20 | LDX | #$20 |
| E007 | A0 00 | LDY | #$00 |
| E009 | 88 | DEY | |
| E00A | D0 FD | BNE | $E009 |
| E00C | CA | DEX | |
| E00D | D0 F8 | BNE | $E007 |
| E00F | A9 03 | LDA | #$03 |
| E011 | 8D 00 40 | STA | $4000 |
| E014 | A9 15 | LDA | #$15 |
| E016 | 8D 00 40 | STA | $4000 |
| E019 | A9 FE | LDA | #$FE |
| E01B | 85 81 | STA | $81 |
| | Playback Main | | |
| E01D | A9 00 | LDA | #$00 |
| E01F | A0 00 | LDY | #$00 |

TABLE IV-continued
DISASSEMBLY LISTING OF ROM DIRECT

| E021 | C8 | INY | |
|---|---|---|---|
| E022 | 20 52 E0 | JSR | $E052 |
| E025 | C9 16 | CMP | #$16 |
| E027 | D0 F8 | BNE | $E021 |
| E029 | 20 50 E0 | JSR | $E050 |
| E02C | C9 FD | CMP | #$FD |
| E02E | D0 F5 | BNE | $E025 |
| E030 | 4C 45 E0 | JMP | $E045 |
| E033 | C9 F9 | CMP | #$F9 |
| E035 | F0 E6 | BEQ | $E01D |
| E037 | AA | TAX | |
| E038 | AD 02 40 | LDA | $4002 |
| E03B | 29 02 | AND | #$02 |
| E03D | F0 F9 | BEQ | $E038 |
| E03F | 8E 01 40 | STX | $4001 |
| E042 | 4C 30 E0 | JMP | $E030 |
| E045 | 20 78 E0 | JSR | $E078 |
| E048 | C0 01 | CPY | #$01 |
| E04A | D0 E7 | BNE | $E033 |
| E04C | F0 CF | BEQ | $E01D |
| | Read Tape Subroutine | | |
| E050 | A0 08 | LDY | #$08 |
| E052 | 86 01 | STX | $01 |
| E054 | 48 | PHA | |
| E055 | 24 85 | BIT | $85 |
| E057 | 10 FC | BPL | $E055 |
| E059 | A5 80 | LDA | $80 |
| E05B | C5 80 | CMP | $80 |
| E05D | F0 FC | BEQ | $E05B |
| E05F | A2 6E | LDX | #$6E |
| E061 | 86 94 | STX | $94 |
| E063 | 45 02 | EOR | $02 |
| E065 | 4A | LSR | |
| E066 | A5 80 | LDA | $80 |
| E068 | 85 02 | STA | $02 |
| E06A | 68 | PLA | |
| E06B | 2A | ROL | |
| E06C | A6 01 | LDX | $01 |
| E06E | 88 | DEY | |
| E06F | D0 E3 | BNE | $E054 |
| E071 | 60 | RTS | |
| E078 | A0 08 | LDY | #$08 |
| E07A | 48 | PHA | |
| E07B | 24 85 | BIT | $85 |
| E07D | 10 FC | BPL | $E07B |
| E07F | A5 80 | LDA | $80 |
| E081 | 48 | PHA | |
| E082 | A2 0D | LDX | #$0D |
| E084 | A5 80 | LDA | $80 |
| E086 | C5 80 | CMP | $80 |
| E088 | D0 07 | BNE | $E091 |
| E08A | CA | DEX | |
| E08B | D0 F9 | BNE | $E086 |
| E08D | 68 | PLA | |
| E08E | 4C A4 E0 | JMP | $E0A4 |
| E091 | A6 80 | LDX | $80 |
| E093 | A9 6E | LDA | #$6E |
| E095 | 85 94 | STA | $94 |
| E097 | 68 | PLA | |
| E098 | 45 02 | EOR | $02 |
| E09A | 4A | LSR | |
| E09B | 86 02 | STX | $02 |
| E09D | 68 | PLA | |
| E09E | 2A | ROL | |
| E09F | 88 | DEY | |
| E0A0 | D0 D8 | BNE | $E07A |
| E0A2 | 60 | RTS | |
| E0A3 | 00 | BRK | |
| E0A4 | A9 85 | LDA | #$85 |
| E0A6 | 85 94 | STA | $94 |
| E0A8 | 68 | PLA | |
| E0A9 | A0 01 | LDY | #$01 |
| E0AB | A9 03 | LDA | #$03 |
| E0AD | 8D 00 40 | STA | $4000 |
| E0B0 | A9 15 | LDA | #$15 |
| E0B2 | 8D 00 40 | STA | $4000 |
| E0B5 | A5 82 | LDA | $82 |
| E0B7 | 49 01 | EOR | #$01 |
| E0B9 | 85 82 | STA | $82 |
| E0BB | 60 | RTS | |

TABLE IV-continued
DISASSEMBLY LISTING OF ROM DIRECT

All Notes Off Routine

| | | | |
|---|---|---|---|
| E0C0 | A0 7F | LDY | #$7F |
| E0C2 | A9 90 | LDA | #$90 |
| E0C4 | 20 E0 E0 | JSR | $E0E0 |
| E0C7 | 98 | TYA | |
| E0C8 | 20 E0 E0 | JSR | $E0E0 |
| E0CB | A9 00 | LDA | #$00 |
| E0CD | 20 E0 E0 | JSR | $E0E0 |
| E0D0 | 88 | DEY | |
| E0D1 | D0 EF | BNE | $E0C2 |
| E0D3 | 4C 1D E0 | JMP | $E01D |

Midi Output Subroutine

| | | | |
|---|---|---|---|
| E0E0 | AA | TAX | |
| E0E1 | AD 02 40 | LDA | $4002 |
| E0E4 | 29 02 | AND | #$02 |
| E0E6 | F0 F9 | BEQ | $E0E1 |
| E0E8 | 8E 01 40 | STX | $4001 |
| E0EB | 60 | RTS | |

Initialization For Record

| | | | |
|---|---|---|---|
| F100 | 78 | SEI | |
| F101 | A2 7F | LDX | #$7F |
| F103 | 9A | TXS | |
| F104 | D8 | CLD | |
| F105 | A2 20 | LDX | #$20 |
| F107 | A0 00 | LDY | #$00 |
| F109 | 88 | DEY | |
| F10A | D0 FD | BNE | $F109 |
| F10C | CA | DEX | |
| F10D | D0 F8 | BNE | $F107 |
| F10F | A9 03 | LDA | #$03 |
| F111 | 8D 00 40 | STA | $4000 |
| F114 | A9 91 | LDA | #$91 |
| F116 | 8D 00 40 | STA | $4000 |
| F119 | A9 FE | LDA | #$FE |
| F11B | 85 81 | STA | $81 |
| F11D | A9 5D | LDA | #$5D |
| F11F | 85 94 | STA | $94 |
| F121 | A9 00 | LDA | #$00 |
| F123 | 85 40 | STA | $40 |
| F125 | 85 41 | STA | $41 |
| F127 | 85 42 | STA | $42 |
| F129 | 85 43 | STA | $43 |
| F12B | 4C 35 F1 | JMP | $F135 |

Record Main

| | | | |
|---|---|---|---|
| F135 | A5 40 | LDA | $40 |
| F137 | C5 42 | CMP | $42 |
| F139 | D0 06 | BNE | $F141 |
| F13B | 58 | CLI | |
| F13C | EA | NOP | |
| F13D | 78 | SEI | |
| F13E | 4C 35 F1 | JMP | $F135 |
| F141 | 78 | SEI | |
| F142 | A9 00 | LDA | #$00 |
| F144 | A2 01 | LDX | #$01 |
| F146 | 20 F4 F1 | JSR | $F1F4 |
| F149 | A0 03 | LDY | #$03 |
| F14B | 84 44 | STY | $44 |
| F14D | A9 16 | LDA | #$16 |
| F14F | 20 F2 F1 | JSR | $F1F2 |
| F152 | C6 44 | DEC | $44 |
| F154 | D0 F7 | BNE | $F14D |
| F156 | A9 FD | LDA | #$FD |
| F158 | 20 F2 F1 | JSR | $F1F2 |
| F15B | A0 00 | LDY | #$00 |
| F15D | B1 42 | LDA | ($42),Y |
| F15F | 20 F2 F1 | JSR | $F1F2 |
| F162 | 18 | CLC | |
| F163 | A5 42 | LDA | $42 |
| F165 | 69 01 | ADC | #$01 |
| F167 | 29 3F | AND | #$3F |
| F169 | 85 42 | STA | $42 |
| F16B | C5 40 | CMP | $40 |
| F16D | D0 EE | BNE | $F15D |
| F16F | A9 F9 | LDA | #$F9 |
| F171 | 20 F2 F1 | JSR | $F1F2 |
| F174 | A9 00 | LDA | #$00 |
| F176 | A2 01 | LDX | #$01 |
| F178 | 20 F4 F1 | JSR | $F1F4 |
| F17B | 58 | CLI | |
| F17C | 4C 35 F1 | JMP | $F135 |

Reset Sequence

| | | | |
|---|---|---|---|
| F180 | 78 | SEI | |
| F181 | A2 7F | LDX | #$7F |
| F183 | 9A | TXS | |
| F184 | D8 | CLD | |
| F185 | A2 20 | LDX | #$20 |
| F187 | A0 00 | LDY | #$00 |
| F189 | 88 | DEY | |
| F18A | D0 FD | BNE | $F189 |
| F18C | CA | DEX | |
| F18D | D0 F8 | BNE | $F187 |
| F18F | A9 03 | LDA | #$03 |
| F191 | 8D 00 40 | STA | $4000 |
| F194 | A9 15 | LDA | #$15 |
| F196 | 8D 00 40 | STA | $4000 |
| F199 | A9 FA | LDA | #$FA |
| F19B | 85 81 | STA | $81 |
| F19D | A9 01 | LDA | #$01 |
| F19F | 85 83 | STA | $83 |
| F1A1 | A5 80 | LDA | $80 |
| F1A3 | 29 04 | AND | #$04 |
| F1A5 | D0 03 | BNE | $F1AA |
| F1A7 | 4C C0 E0 | JMP | $E0C0 |
| F1AA | A9 91 | LDA | #$91 |
| F1AC | 8D 00 40 | STA | $4000 |
| F1AF | 4C 1D F1 | JMP | $F11D |

Interrupt Handler

| | | | |
|---|---|---|---|
| F1D0 | 48 | PHA | |
| F1D1 | 8A | TXA | |
| F1D2 | 48 | PHA | |
| F1D3 | BA | TSX | |
| F1D4 | B5 03 | LDA | $03,X |
| F1D6 | 09 04 | ORA | #$04 |
| F1D8 | 95 03 | STA | $03,X |
| F1DA | AD 03 40 | LDA | $4003 |
| F1DD | C9 FE | CMP | #$FE |
| F1DF | F0 0D | BEQ | $F1EE |
| F1E1 | A0 00 | LDY | #$00 |
| F1E3 | 91 40 | STA | ($40),Y |
| F1E5 | 18 | CLC | |
| F1E6 | A5 40 | LDA | $40 |
| F1E8 | 69 01 | ADC | #$01 |
| F1EA | 29 3F | AND | #$3F |
| F1EC | 85 40 | STA | $40 |
| F1EE | 68 | PLA | |
| F1EF | AA | TAX | |
| F1F0 | 68 | PLA | |
| F1F1 | 40 | RTI | |

Write Tape Subroutine

| | | | |
|---|---|---|---|
| F1F2 | A2 07 | LDX | #$07 |
| F1F4 | 0A | ASL | |
| F1F5 | 48 | PHA | |
| F1F6 | 08 | PHP | |
| F1F7 | 24 85 | BIT | $85 |
| F1F9 | EA | NOP | |
| F1FA | 10 FB | BPL | $F1F7 |
| F1FC | A9 5D | LDA | #$5D |
| F1FE | 85 94 | STA | $94 |
| F200 | 28 | PLP | |
| F201 | 90 06 | BCC | $F209 |
| F203 | A5 80 | LDA | $80 |
| F205 | 49 80 | EOR | #$80 |
| F207 | 85 80 | STA | $80 |
| F209 | 58 | CLI | |
| F20A | EA | NOP | |
| F20B | 78 | SEI | |
| F20C | 24 85 | BIT | $85 |
| F20E | EA | NOP | |
| F20F | 10 FB | BPL | $F20C |
| F211 | A9 50 | LDA | #$50 |
| F213 | 85 94 | STA | #94 |
| F215 | A5 80 | LDA | $80 |
| F217 | 49 80 | EOR | #$80 |
| F219 | 85 80 | STA | $80 |
| F21B | 68 | PLA | |
| F21C | CA | DEX | |
| F21D | 10 D5 | BPL | $F1F4 |
| F21F | 60 | RTS | |

Vectors

| | | |
|---|---|---|
| NMI | RST | IRQ |

TABLE IV-continued

| DISASSEMBLY LISTING OF ROM DIRECT | | |
|---|---|---|
| F180 | F180 | F1D0 |

It will be apparent from the foregoing description that the present invention provides an improved real time system for converting high transmission rate serial format digital data byte groups of a given density into lower transmission rate, higher density, serial format digital data byte groups, and vice versa, to faciliate recording of such data on, and playback of such data from, an inexpensive recording medium. The invention provides an inexpensive accessory to MIDI-equipped synthesizers, allowing the recording of MIDI event signals in their proper real time rythmic and melodic manifestation. The invention encompasses an improved method of converting the digital data byte groups from high transmission rate to lower transmission rate, and vice versa, as well as improved equipment for doing this. It also contemplates the provision of a recording medium having digital data stored thereon in an improved format that includes synchronization character and start-of-record character bytes which precede the digital data information and an end-ofrecord character byte that succeeds the digital data information.

While there has been shown and described what is presently considered to be the preferred embodiment of this invention, it will be obvious to those skilled in the art that various changes and modifications may be made without departing from the broader aspects of this invention. It is, therefore, aimed in the appended claims to cover all such changes and modifications as fall within the true spirit and scope of this invention.

What is claimed is:

1. In a method of recording randomly occurring high transmission rate serial MIDI format data byte groups of a variable low density onto a low bandwidth recording medium, the steps of
   (A) converting each of said serial MIDI format data byte groups into a corresponding randomly occurring lower transmission rate serial data byte group in real time; and
   (B) recording said lower transmission rate serial data byte groups at a higher density than said low density, in real time, on a single track of a moving recording medium of low bandwidth.

2. In a method of recording randomly occurring high transmission rate serial MIDI format data byte groups of a variable low density onto a low bandwidth recording medium, the steps of
   (A) converting each of said serial MIDI format data byte groups into a corresponding randomly occurring parallel data byte group in real time;
   (B) encoding each parallel data byte group into a lower transmission rate serial data byte group in real time; and,
   (C) recording said lower transmission rate serial data byte groups at a higher density than said low density, in real time, on a single track of a moving recording medium of low bandwidth.

3. A method of recording according to any one of claims 1 or 2, wherein each of the data byte groups includes three bytes therein and each of the bytes in each of the groups is encoded with digital data relating to one aspect of an event that is different from the aspects of the event encoded on the other of the bytes in its group.

4. A method of recording according to claim 3, wherein said encoding step includes the steps of encoding at least to synchronization character bytes and one start-of-record character byte positioned before, and at least one end-of-record character byte positioned after, each data byte event group or each series of data byte event groups representing simultaneously occurring events.

5. A method of recording according to claim 4, wherein each of the data bytes in said groups of data bytes represents information relating to notes of musical instrument keyboards, the first byte of each group containing status information identifying at least whether a note is turned on or off, the second byte of each group containing numeric information identifying at least the specific note to be turned on or off, and the third byte of each group containing dynamic information identifying at least the loudness with which the note is to be played.

6. In a method of playing back low transmission rate serial format data byte groups of a randomly occurring density that are recorded on a single track of a low bandwidth recording medium, the steps of
   (A) converting each of said serial format data byte groups into a corresponding MIDI format higher transmission rate serial data byte group in real time; and,
   (B) playing back said higher transmission rate serial data byte groups at a lower density than said randomly occurring density and at real time in a MIDI playback device.

7. In a method of playing back low transmission rate serial format data byte groups of a randomly occurring density that are recorded on a single track of a low bandwidth recording medium, the steps of
   (A) converting each of said serial format data byte groups into a corresponding parallel data byte group in real time;
   (B) encoding each of said parallel data byte groups into a MIDI format higher transmission rate serial data byte group in real time; and,
   (C) playing back said higher transmission rate serial data byte groups at a lower density than said randomly occurring density and at real time in a MIDI playback device.

8. A method of playing back data byte groups recorded on a recording medium according to any one of claims 6 or 7, wherein each of the data byte groups includes three bytes therein and each of the bytes in each of the groups is encoded with digital data relating to one aspect of an event that is different from the aspects of the event encoded on the other of the bytes in its group.

9. A method of playing back data byte groups according to claim 8, wherein each data byte event group or each series of data byte event groups representing simultaneously occurring events in said low transmission rate serial format data byte groups forms part of a string of bytes in which each said data byte event group or each said series or data byte event groups is preceded by at least two synchronization character bytes and one start-of-record character byte, and is followed by at least one end-of-record character byte, and further including the step of deleting said character bytes from said string o bytes so that said MIDI format higher transmission rate serial format data byte groups are formed into strings of data byte groups that are devoid of said synchronization, start-of-record and end-of-record character bytes.

10. A method of playing back data byte groups according to claim 9, wherein each of the data bytes in said groups of data bytes represents information relating to notes of musical instrument keyboards, the first byte of each group containing status information identifying at least whether a note is turned on or off, the second byte of each group containing numeric information identifying at least the specific note to be turned on or off, and the third byte of each group containing dynamic information identifying at least the loudness with which the note is to be played.

11. Apparatus for converting randomly occurring high transmission rate serial MIDI format data byte groups into lower transmission rate serial format data byte groups, comprising:
 (A) means adapted to connect said apparatus to a source of said high transmission rate serial MIDI format data byte groups of a variable low density;
 (B) means for converting each of said high transmission rate serial MIDI format data byte groups into a corresponding randomly occurring lower transmission rate serial format data byte group in real time; and,
 (C) means adapted to connect said apparatus to a recording device for transmitting said lower transmission rate serial format data groups at a higher density than the variable low density, in real time, to a single track of a moving recording medium of low bandwidth.

12. Apparatus for converting randomly occurring high transmission rate serial MIDI format data byte groups into lower transmission rate serial format data byte groups, comprising:
 (A) means adapted to connect said apparatus to a source of said high transmission rate serial MIDI format data byte groups of a variable low density;
 (B) means for converting each of said high transmission rate serial MIDI format data byte groups into a corresponding parallel data byte group in real time;
 (C) means for encoding each of said parallel data byte groups into a lower transmission rate serial format data byte group in real time; and,
 (D) means adapted to connect said apparatus to a recording device for transmitting said lower transmission rate serial format data groups at a higher density than the variable low density, in real time, to a single track of a moving recording medium of low bandwidth.

13. Apparatus according to any one of claims 11 or 12, wherein each of the data byte groups includes three bytes therein, and wherein each of the bytes in each of the groups is encoded with digital data relating to one aspect of an event that is different from the aspects of the event encoded on the other of the bytes in its group.

14. Apparatus according to claim 13, wherein said encoding means includes means for adding at least two synchronization character bytes and one start-of-record character byte before, and at least one end-of-record character byte after, each data byte event group or each series of data byte event groups representing simultaneously occurring events.

15. Apparatus according to claim 14, further including means adapted to be connected to a recording medium player for receiving encoded serial format data byte groups from the player; means for decoding the encoded data byte groups to delete the synchronization, start-of-record and end-of-record character bytes therefrom; means for converting said data byte groups into a serial MIDI format at a higher transmission rate than said lower transmission rate; and, means adapted to be connected to a MIDI output device for transmitting the decoded converted data byte groups to said output device.

16. Apparatus for playing back low transmission rate serial format data byte groups of at least one byte each, which groups are recorded on a single track of a low bandwidth recording medium at a randomly occurring density, comprising:
 (A) means adapted to be connected to a recording medium reproducing device for receiving said data byte groups from said recording medium in real time;
 (B) means for converting said low transmission rate serial format data byte groups into corresponding MIDI format higher transmission rate serial data byte groups in real time and at a lower density than said randomly occurring density; and,
 (C) means adapted to connect said apparatus to a MIDI playback device for playing back said higher transmission rate serial data byte groups in real time.

17. Apparatus for playing back low transmission rate serial format data byte groups of at least one byte each, which groups are recorded on a single track of a low bandwidth recording medium at a randomly occurring density, comprising:
 (A) means adapted to be connected to a recording medium reproducing device for receiving said data byte groups from said recording medium in real time;
 (B) means for converting each of said low transmission rate serial format data byte groups into a corresponding parallel data byte group in real time;
 (C) means for encoding each of said parallel data byte groups into a MIDI format higher transmission rate serial data byte group in real time and at a lower density than said randomly occurring density; and,
 (D) means adapted to connect said apparatus to a MIDI playback device for playing back said higher transmission rate serial format data byte groups in real time.

18. Apparatus according to any one of claims 16 or 17, wherein each of said data byte groups includes three bytes therein, and wherein each of the bytes in each of the groups is encoded with digital data relating to one aspect of an event that is different from the aspects of the event encoded on the other of the bytes in its group.

19. Apparatus according to claim 18, wherein each data byte event group, or each series of data byte event groups representing simultaneously occurring events, in said low transmission rate serial format data byte groups forms part of a string of bytes in which each said data byte event group or each said series of data byte event groups is preceded by at least two synchronization character bytes and one start-of-record character byte, and is followed by at least one end-of-record character byte, and further including means for deleting said character bytes from said string of bytes so that said higher transmission rate serial format data byte groups are formed into strings of data byte groups that are devoid of said synchronization, startof-record and end-of-record character bytes.

20. A single track recording medium having digital data stored thereon in a format that includes a plurality of data records separated from one another by blank spaces representing real time spacing of said data records, each of said data records including at least two initial synchronization character bytes, followed by one or more character bytes signifying the start of a record of an event, followed by one or more groups of bytes, each of said groups including at least one byte therein, each of said bytes being coded with data relating to an aspect of the event that is different from the aspects of the event encoded on the other of the bytes in its group, said group or groups of bytes being followed by one or more character bytes signifying the end of the record of the event.

21. A recording medium according to claim 20, wherein each of said groups includes three bytes therein.

22. A recording medium according to any one of claims 20 or 21, wherein said format includes three initial synchronization character bytes, one start-of-record character byte and one end-of-record character byte therein.

23. A recording medium according to claim 22, wherein said recording medium comprises a medium selected from the group consisting of cassette tapes, open reel tapes, recording wires, continuous track magnetic discs, compact disc records, and grooved phonograph records.

24. A real time MIDI to single track low bandwidth recording medium recording and playback system, comprising:
(A) a music synthesizer capable of receiving and transmitting serial MIDI format data byte groups;
(B) an apparatus (i) for converting serial MIDI format data byte groups received from said synthesizer to higher density lower transmission rate serial data byte groups capable for being recorded on and played back from a single track low bandwidth recording tape, and (ii) for converting higher density lower transmission rate serial data byte groups received from a single track low bandwidth recording tape back into serial MIDI format data byte groups and transmitting said latter groups back to said synthesizer; and,
(C) a tape recording and playback mechanism (i) for receiving and recording said higher density lower transmission rate serial data byte groups on said single track low bandwidth recording tape, and (ii) for playing back said higher density lower transmission rate serial data byte groups from said tape and transmitting said groups back to said converting apparatus.

* * * * *

UNITED STATES PATENT AND TRADEMARK OFFICE
CERTIFICATE OF CORRECTION

PATENT NO. : 4,953,039

DATED : August 28, 1990

INVENTOR(S) : Louis W. Ploch

It is certified that error appears in the above-identified patent and that said Letters Patent is hereby corrected as shown below:

Title page , Abstract, col. 2, line 26, "follopwed" should read --followed--.
Column 3, line 1, "o" should read --of--.
Column 3, line 7, "group" should read --groups--.
Column 5, line 30, "an" should read --any--.
Column 7, line 29, " "O[ " should read --"O"--.
Column 8, line 1, "ar" should read --are--.
Column 12, line 66, "wit" should read --with--.
Column 18, line 5, "to" should read --two--.
Column 18, line 66, "o" should read --of--.
Column 22, line 11, "for" should read --of--.

Signed and Sealed this

Thirty-first Day of December, 1991

Attest:

HARRY F. MANBECK, JR.

*Attesting Officer*  *Commissioner of Patents and Trademarks*